March 30, 1954     F. H. MUMBERG     2,673,466
ADJUSTABLE DIFFERENTIAL THERMOMETER
Filed April 7, 1948
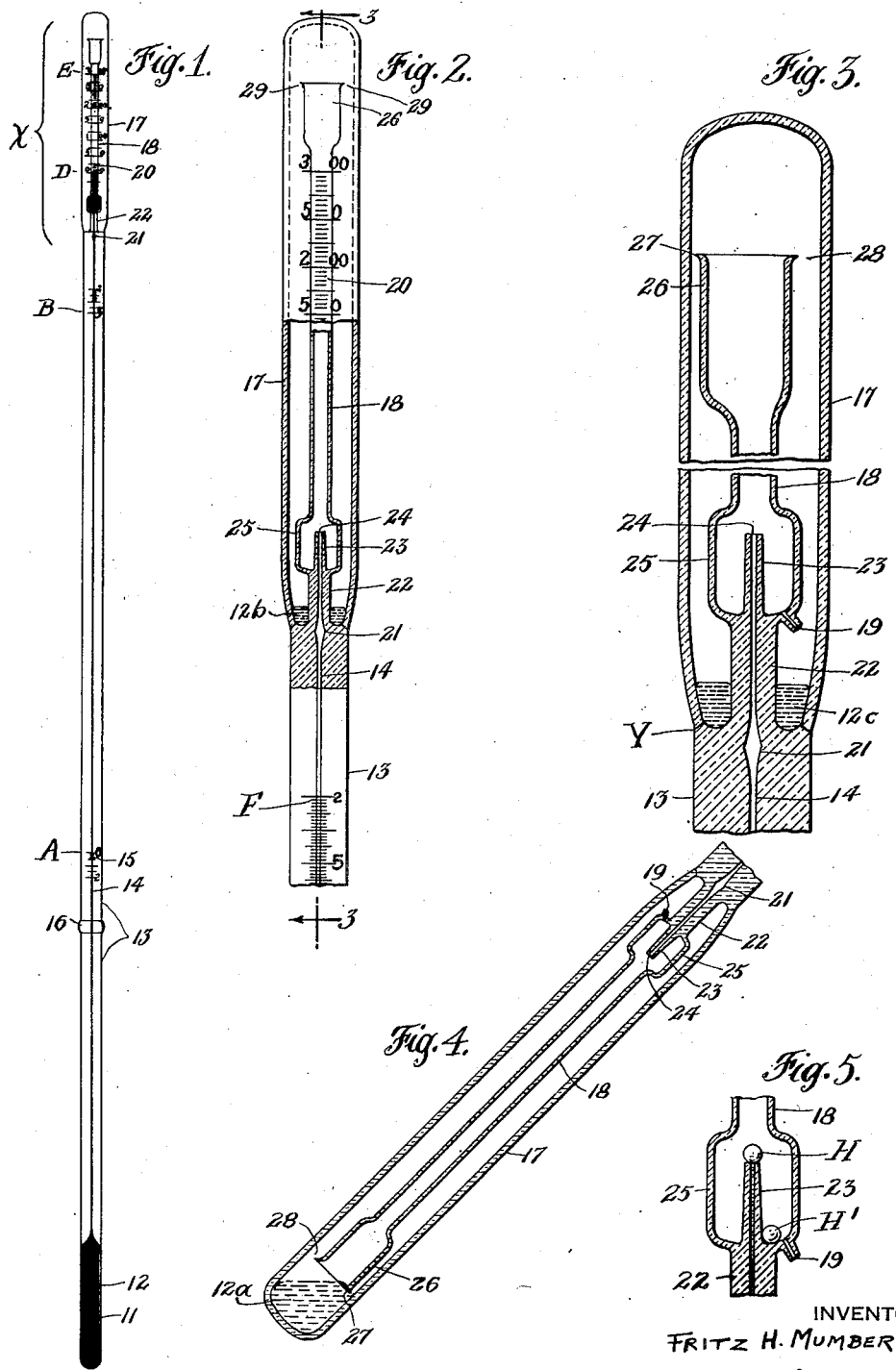
INVENTOR.
FRITZ H. MUMBERG
BY
ATTORNEYS.

Patented Mar. 30, 1954

2,673,466

UNITED STATES PATENT OFFICE 2,673,466

ADJUSTABLE DIFFERENTIAL THERMOMETER

Fritz H. Mumberg, Philadelphia, Pa., assignor to Precision Thermometer and Instrument Company, a corporation of Pennsylvania Application April 7, 1948, Serial No. 19,475

6 Claims. (Cl. 73—371)

This invention relates to adjustable, differential thermometers.

In this field, there has long been known an instrument identified as the Beckmann thermometer, wherein a fine capillary tube, having graduations for close determination of a small change in temperature, is coupled with a tubular loop of larger bore, which loop may serve as a reservoir to hold different desired quantities of the thermometric liquid, taken from the working column, whereby to adjust the readings which may be secured from said scale. It has been the practice to exhaust the upper end of the tube (that is, the space above the mercury or other liquid used) so that the column is working in substantially a vacuum. This limits rather severely the range of temperatures for which a given instrument may be used, since the liquids ordinarily employed, such as mercury, gallium, mercury-thallium amalgam, etc., will of course boil at lower temperatures under vacuum conditions than under conditions of appreciable pressure. Also, some types of such instruments have been exceptionally difficult and costly to make and/or of a rather delicate nature when made.

Adjustable differential thermometers have been made and operated with the thermometric liquid subjected to a gaseous medium under pressure, so as to make possible a higher maximum operating temperature of the instrument and/or to increase its operating range, but some of them, as made or proposed, have been characterized by other drawbacks. For example, they have been difficult to adjust, so that the adjustment, to set them for different operating temperatures, has required considerable skill and takes more time than is the case with the present invention. Further, they have not been capable of giving a direct visual reading of the setting for any of a series of adjustments.

My invention contemplates the elimination or minimizing of difficulties such as those mentioned, and in general the provision of a very accurate thermoresponsive device or instrument, capable of ready and accurate setting or adjustment so as to function at different desired temperatures.

The invention further has in view the accomplishment of the foregoing while at the same time securing direct readability of the various absolute settings of which the instrument is capable.

Still further, the invention has for an object the provision of an instrument having one or more of the above novel and advantageous characteristics which is quickly adjustable for substantial differences in setting and at the same time has means of fine adjustment for slight changes of setting.

Further, the invention contemplates an instrument of one or more of the above characteristics, which may be constructed to operate safely and reliably at temperatures up to 350, 500, or even 600 degrees centigrade, as compared with an upper limit of about 200° centigrade for known vacuum types.

Furthermore, the invention contemplates the attainment of the foregoing in an instrument of sturdy construction, which can be manufactured within a practical limit of cost.

How the foregoing objects and advantages are secured, together with others which may be incident to the invention or may occur to those skilled in the art, will be apparent from the following description, taken together with the accompanying drawings, wherein:

Figure 1 is an elevational view of an adjustable differential thermometer constructed and operating according to the present preferred embodiment of my invention, most of the graduations being omitted, for simplicity of the drawing;

Figure 2 is a view to a larger scale of approximately the upper one-fifth of the instrument of Figure 1, with a portion of it shown in vertical section;

Figure 3 is a sectional view to a still larger scale, taken on the line 3—3 of Figure 2 but with a part broken out, to shorten the figure;

Figure 4 is a view of the same section as Figure 3 (but to the scale of Figure 2), showing the device head down, at a 45° angle to the vertical; and Figure 5 is a fragmentary section, illustrating the operation of the metering orifice.

The instrument comprises a bulb 11, normally filled with the operating liquid 12, and a body 13 formed with a fine bore or capillary tube 14, the lower end of said capillary being in open communication with the interior of the bulb 11. The body 13 may be a continuous glass tube, of one piece ab initio, or for convenience and accuracy of manufacture the portion carrying the differential scale 15 may be initially formed separately from the lower portion and subsequently joined thereto, as at 16, which may have the further advantage of permitting differences in form or character of the upper and lower portions of the main body, if desired. For example, the portion of the body 13 below the joint 16 may thus be made of round section, if desired, while the portion thereabove may be formed with a lens front to facilitate reading of the differential scale.

Where mercury is used as the operating liquid, and a graduated scale covering 5° centigrade between the point A and the point B is desired, a typical proportioning of the instrument would be as follows:

The capacity of the bulb 11 and of the capillary tube up to the point A would be 1.5 c. c., the length of the scale from A to B would be 25 centimeters, and the bore 14 (within the region of the scale, i. e. from A to B) would be 0.1 of a millimeter in diameter. The finest graduations on this scale, as shown at F on Figure 2, would each represent $\frac{1}{100}$ of 1° centigrade. Such an instrument gives a very accurate or sensitive reading—the whole scale A to B representing, as above stated, only 5° C. in the typical example given. (A few graduations—for example, twenty 100ths—above and below the scale of 5° are provided for convenience in calibration at the 0 and 5° marks; and for the purpose of facilitating the carrying over of readings from one setting of the instrument to another.) In the general science of calorimetry, such a sensitive instrument may be used for the determination of specific heats, latent heats of vaporization and heat of fusion; and in the separation by fractional distillation of materials of closely related boiling points.

For different typical uses, however, the point at which the measurement is to commence may be quite different. Indeed, in the case of molecular weight determination by depression of freezing-point method, it may be desired that the reading at point A on the scale would be −5° centigrade, whereas in the case of ebulliometry the reading at point A on the scale would be very much higher, for instance at 98° centigrade.

For purposes of adjusting the instrument to operate at various points or ranges, it is equipped at the top with an adjustment device or assembly, generally indicated in Figure 1 at X. All the parts of this assembly may be formed integrally with the main body of the instrument, or one or more parts thereof formed separately and then secured thereto. Typical lines of juncture are shown at the base of the assembly (at Y in Fig. 3) where the glass parts are fused together, when they are initially formed separately.

As shown in Figure 1, and in more detail in Figures 2 to 5, the adjusting part of the instrument comprises an exterior shell or envelope 17 forming a chamber for gas under pressure (as hereinbefore mentioned) and also constituting a reservoir for an operating liquid; and, associated with said reservoir (preferably within the shell 17 which forms the same) a vented extension tube 18 which latter is provided, in the preferred embodiment of the invention, with a vent at 19 and other features hereinafter described. The gas in the instrument may desirably be nitrogen or hydrogen.

According to the invention, the extension tube 18 is of relatively coarse bore, and the whole extension is so proportioned, relative to the other parts of the instrument, and so coupled with the relatively fine bore 14 of the main body, that the forcing of operating liquid up into said extension will, in conjunction with the reference scale 20, give a direct reading of the various temperatures to which the instrument may from time to time be adjusted.

It may here be noted that the scale 20, extending for example from D to E (which, in the typical instrument mentioned, may be a distance of about 5 centimeters) may be made to cover any desired practical range, for example a range of 335° centigrade, graduated in 5° intervals by individual markings, as shown. This is a relatively coarse graduation, for quick adjustments of the instrument in large amounts, but another feature, hereinafter described, is used as a sort of vernier to secure much finer settings of the instrument, for instance in increments of a fraction of a degree. It may further be noted at this point that the scale 20, in the preferred embodiment, is for convenience of manufacture placed on the outside of the shell 17, but it may be placed on tube 18 or otherwise located if preferred. If the desired range of adjustment is to run from −35° C to +300° C., with mercury as the liquid, the gas pressure within the reservoir would typically be about two atmospheres (at ordinary room temperatures). In some embodiments, however, the gas contained in the instrument may be at a positive pressure less than atmospheric.

Advantageously, though not absolutely essential for all purposes, the shell 17 is a direct vertical cylindrical addition to the main body 13 of the instrument, and the tube 18, of relatively coarse bore (for example, 1 millimeter) as compared with the bore 14, is a direct vertical extension of the latter and is centrally disposed within said shell 17. The bore 14 may advantageously have a small enlargement at 21, forming an expansion chamber for the purpose hereinafter explained.

The capillary or bore 14 extends on up through the neck 22 and terminates in a vertical tip 23 having a metering orifice 24, in the lower region of the extension tube 18.

Although not in all cases essential, the preferred embodiment includes a break-away chamber 25 at the lower end of tube 18, of about double the diameter of the rest of the main portion of said tube, into which said tip 23 extends. The gas vent or relief passage 19 extends between the interior of tube 18 and the reservoir formed by the shell 17, and where the break-away chamber is used it is preferable that the vent 19 be placed adjacent the base of the latter, somewhat below the metering orifice 24. The diameter of the passage in the extension 18, or of the break-away chamber 25, is made large enough to facilitate the breaking away of the measured quantity of mercury or other liquid from the body thereof in the capillary 14.

At its upper end, the extension 18 carries a scoop 26, which is desirably in the form of a tubular funnel, having its longitudinal axis however offset rearwardly of the instrument, i. e. toward that wall of the shell 17 which is opposite the scale 20. Thus the lip 27 is at the rear side quite close to (and in fact it may abut) the inner surface of the wall of the shell so that operating liquid in the reservoir may be picked up by the scoop, whereas toward the front and the sides there is ample space for the passage of the operating liquid (see space 28 in Fig. 3, and 29, 29 in Fig. 2). The commencement of the transfer of liquid from the reservoir to the scoop 26 (by means of the above construction) is illustrated in Figure 4.

From Figures 3 and 4 it will also be seen that the vent 19 is disposed oppositely to the scoop 26, i. e. if the scoop 26 is disposed at the back of the instrument the vent 19 is disposed toward the front. The communication of the upper end of tube 18 with the reservoir, as by means of the funnel-shaped scoop, is thus adapted for the transfer of the operating liquid whereas the vent 19 is so restricted that the surface tension of the mercury or other liquid will normally prevent it from passing through the vent. The vent however allows the passage of gas from the reservoir into the tube when liquid is being passed from the tube to the reservoir, and conversely allows gas to pass from the tube to the reservoir when liquid is passing from the reservoir to the tube.

A typical operation of the mechanism will now be described. Assuming that the instrument is designed for use as a differential thermometer (having a range of 5° centigrade, as hereinbefore used for illustration) it will now be shown how the instrument may be initially set, for example so that point A on the differential scale represents an absolute temperature of 0° centigrade, and how it may be changed from such initial setting to a setting where point A will represent 200° centigrade.

At the initial setting, with no mercury in the reservoir 17, there will first be mercury in the tube 18 up to the point on the scale 20 where said scale reads "0" (as seen in Fig. 1), showing that the instrument is set for a reading of 0° centigrade at the point A on the differential scale. This initial setting of course requires that the circumambient temperature, with which the bulb 11 is in contact, be such as to cause the total column of liquid in the instrument to fill the space comprising the bulb 11, the capillary 14, and the extension tube 18 up to the said "0" point, but no more. When such continuous column reaches said point, the instrument is inverted and the mercury within the break-away chamber 25 and extension 18 passes out of the scoop or funnel 26 into the reservoir 17, for instance as seen in Fig. 4. From the position shown in Fig. 4, the instrument is turned, counterclockwise as seen in that figure, until the mercury shown at 12a passes through the gap 28 and lodges in the bottom of the reservoir as shown at 12b in Fig. 2, whereupon the instrument is ready for use at the particular setting chosen. The amount of mercury then remaining in the bulb and in the fine capillary up to the metering orifice 24 is the amount necessary to give an operating range of 5° C. (from point A on the differential scale to point B on the differential scale).

Now, to adjust the instrument so that the point A of the differential scale would represent a temperature of 200° C., the bulb 11 is first warmed (while the instrument is held vertical or approximately so), until there is a continuous column of mercury extending from the bulb 11, up through the capillary 14 and to the metering orifice 24. Then the mercury at 12b in the reservoir is brought back into the measuring tube 18, by turning the instrument to about the position of Fig. 4, and then turning it clockwise from that position to the upright position, so that the lip of the scoop 26 will catch the mercury and cause it to flow into said tube as the instrument is righted. The bulb 11 is then further warmed until the continuous column of mercury extends up through the break-away chamber 25, and measuring tube 18, to the reading "200" on the scale 20. The instrument is then inverted, as before, to spill the liquid out of the measuring tube and its break-away chamber, which liquid is then lodged in the reservoir as shown at 12c in Fig. 3, which it will be noted is a larger amount than the amount 12b in Fig. 2. The amount then remaining in the bulb and fine capillary will be the amount necessary to give an operating range of 200 to 205° centigrade, from A to B on the differential scale.

Quick adjustments of the instrument can thus be made. If a finer adjustment is desired, the bulb 11 can be warmed gradually, until a drop of mercury, as shown at H, in Fig. 5, has been exuded from the metering orifice 24. (Another drop is shown at H', as having just dropped off the metering tip, into the bottom of the break-away chamber.) If the metering orifice is made quite small, the careful metering off of mercury, one drop at a time, may be employed to change the setting by fractions of a degree.

For adjusting the instrument from a higher to a lower setting, it is only necessary to warm the bulb until a continuous column of liquid is formed from the bottom of the instrument up to the metering orifice, then transfer any liquid in the reservoir back into the measuring tube, make sure of connection of the whole mass of liquid, then cool the bulb until the reading at the measuring tube has dropped to the desired point, invert the instrument as before in order to transfer liquid from the tube to the reservoir, and then right it. The liquid remaining in the bulb and fine capillary will be that which is required for the desired lower setting.

In any of these adjustment operations, it will be obvious that when the instrument is in a position to drop mercury from the tube 18 into the reservoir the vent will permit gas to flow into the tube behind the out-flowing mercury; and when in position to scoop up mercury from the reservoir into the tube (see Fig. 4) the vent 19 will be so located as to relieve what otherwise would be a trapping of the gas.

It may here be noted that the small expansion chamber 21 is for the purpose of avoiding inadvertent changes in setting in case the instrument happens to be subjected temporarily to a temperature above the range at which it is at the time being used.

As a matter of practice, in manufacture, the minimum amount of mercury in the instrument would be the amount needed to fill the bulb 11, the capillary 14, the break-away chamber 25, and the tube 18 up to the bottom of the auxiliary scale; and, in use, the minimum amount in the reservoir would be the volume of the break-away chamber and tube 18 up to the bottom of said scale.

With the above explanation of typical adjustments of the instrument, it is believed that the construction, operation and advantages of the device will be apparent without further explanation.

I claim:

1. A differential thermometer comprising a tube having a bulb for thermometric liquid and a working bore of relatively fine dimension in communication at one end thereof with said bulb, an extension tube with a relatively coarse bore having one end thereof communicating with the other end of said fine bore, a thermometric liquid reservoir adjacent the extension tube, the bore of the extension tube and the reservoir being in communication with each other through the other end of the extension tube, a gas under pressure in the extension tube and the reservoir, and a gas relief passageway establishing communication between the bore of the extension tube at the first said end thereof and the reservoir.

2. A thermometer according to claim 1 wherein the extension tube is provided with a break-away chamber adjacent the said one end of the working bore and wherein the gas passage extends from said break-away chamber to the reservoir.

3. A differential thermometer having an indicating liquid column, which thermometer, when it is arranged in substantially upright position, comprises a tube having a bulb for thermometric liquid and a working bore of relatively fine dimension, an upper extension tube with a relatively coarse bore communicating with the upper end of said fine bore, the outlet of the working bore, however, being located at a point above the bottom of the extension tube, a thermometric liquid reservoir lying along the extension tube and having its lower end extending down to a point below the bottom of the extension tube, the extension tube and the reservoir being in communication with each other through an opening at the top of the extension tube, a gas under pressure in the extension tube and the reservoir, and a gas relief passageway establishing communication between the interior of the extension tube and the reservoir, said passageway being arranged to open into the extension tube at a point to one side of and below the outlet of the working bore and into said reservoir at a point above its bottom on the same side.

4. A thermometer according to claim 3 wherein the extension tube is provided with a break-away chamber adjacent the upper end of the working tube and wherein the gas passage extends from said break-away chamber to the reservoir.

5. A thermometer according to claim 3 wherein the reservoir is formed as a chamber surrounding the extension tube.

6. A thermometer according to claim 3 wherein the reservoir is formed as a chamber surrounding the extension tube and wherein the extension tube is formed at the top as a scoop or funnel arranged in close proximity to the side of the reservoir which is opposite to the side where the gas relief passageway is located, said scoop or funnel defining said liquid opening at the top of said extension tube, there being a fluid passageway between said scoop and the opposite wall of said reservoir.

FRITZ H. MUMBERG.

References Cited in the file of this patent

UNITED STATES PATENTS

| Number | Name | Date |
| --- | --- | --- |
| 1,199,121 | Siebert | Sept. 26, 1916 |
| 1,945,434 | Greer | Jan. 30, 1934 |
| 2,320,753 | Schwartz | June 1, 1943 |

OTHER REFERENCES

Beckmann, pages 337 and 338; Zeitschrift Fur Physikalische Chemie; V51, #3, 1905.

Page 497 of Catalogue of the Central Scientific Co. (Catalogue C, #222, 1922), QD 53 .C397.

Page 650 of the Catalogue of the Braun-Knecht-Heimann-Co. (Catalogue #27, 1927), QD 53 B825.